United States Patent [19]
Williams

[11] Patent Number: 5,568,307
[45] Date of Patent: Oct. 22, 1996

[54] APPARATUS FOR CONTROLLING THE REFLECTANCE OF AN OBJECT SURFACE

[75] Inventor: Eric R. Williams, Murrieta, Calif.

[73] Assignee: McDonnell Douglas Corporation, Huntington Beach, Calif.

[21] Appl. No.: 384,022

[22] Filed: Feb. 7, 1995

[51] Int. Cl.⁶ .................................................. G02B 26/00
[52] U.S. Cl. ........................ 359/295; 359/290; 359/848; 359/849
[58] Field of Search ................................... 359/295, 290, 359/291, 298, 263, 250, 249, 247, 503, 848, 849

[56] References Cited

U.S. PATENT DOCUMENTS

| 3,463,572 | 8/1969 | Preston, Jr. ........................... 359/295 |
| 3,507,737 | 4/1970 | Busdiecker et al. ................... 359/848 |
| 3,644,022 | 2/1972 | Jagdt et al. ............................ 359/848 |
| 3,904,274 | 9/1975 | Feinleib et al. ........................ 359/295 |
| 4,035,061 | 7/1977 | Sheridon ................................ 359/295 |
| 4,466,700 | 8/1984 | Christiansen et al. ................. 359/848 |
| 5,076,700 | 12/1991 | DeCaprio ............................... 359/848 |

Primary Examiner—Loha Ben
Attorney, Agent, or Firm—George J. Netter; John P. Scholl

[57] ABSTRACT

A reflectance modulator (10) includes a reflective plate (16) with a plurality of slots (18) forming a slot matrix of square portions (20). Side wall plates (22) are each slidingly received within a slot (18) forming a plurality of black body cavities (24) facing incoming radiation. Actuators (28) support the reflective plate (16) with respect to an object surface (12) and are energizable to modify the spacing of plate (16) from the surface (12) changing depth of the cavities (24) and reflectance of radiation.

21 Claims, 3 Drawing Sheets

APPARATUS FOR CONTROLLING THE REFLECTANCE OF AN OBJECT SURFACE

BACKGROUND

1. Field of the Invention

The present invention relates generally to an apparatus for selectively varying the reflectance of electromagnetic energy from an object surface and, more particularly, such apparatus of mechanical electrical construction which operates over a relatively wide reflectance dynamic range, has low power requirements, and higher switching speed compared to other known reflectance control measures.

2. Description of Related Art

There are many situations in which the surface of an object or craft may experience a substantial exposure to radiation in the thermal band (3–18 microns), for example, requiring considerable dissipation in order to protect the object from deleterious results or even total destruction. It is particularly true of a space craft which may be exposed on one surface to a very high amount of thermal band radiation while adjacent surfaces remain potentially radiation free, the resulting high temperature differential of the space craft posing additional danger. Accordingly, it is desirable to have some way for selectively controlling reflectance from the surface of a craft or other object in order to manage the amount of heat induced into the object and, in that way, maintain the temperature within appropriate limits.

In the past, devices operating on a chemical and electrical basis, referred to generally as electrochromics, have been used for reflectance control. These devices have been found to experience chemical breakdown on exposure to ultraviolet radiation making them substantially inoperative for the desired reflectance variation purposes. Also, electrochromics devices are life cycle limited, have limited operational dynamic ranges and relatively slow switching cycle times, all of which leave them less than fully satisfactory for practical use.

SUMMARY OF THE INVENTION

In accordance with the present invention apparatus is provided for mounting onto a surface of an object for altering the reflectance of the radiation away from the object. The device includes a plurality of identically shaped plates of generally rectangular configuration which are arranged with an end of each mounted onto the surface of the object and extending away therefrom in a generally mutually parallel condition to each other and forming a plurality of chambers or cavities opening outwardly away from the object surface. A reflective modulator plate has an appropriate plurality of slots therein to permit placing onto the plates and sliding therealong producing a corresponding change in depth of the cavities. An actuator (e.g., piezoelectric element) is electrically controllable to selectively move the modulator plate away or toward the object surface. A cover constructed of a suitably radiation transparent material depending upon the radiation range to be controlled may optionally be placed on the upper and outer ends of the plates and secured in a suitable manner to the actuator so as to form a unitary construction and protect the cavities where needed.

In operation to increase radiation reflectance away from the object, the actuator is energized to move the modulator plate in such a direction as to alter the depth of the black-body cavities formed by the plates between the transparent cover and the modulator plate. Appropriate modification in this regard provides a corresponding modification of the reflectance of the incoming radiation and thus achieves substantially optimal radiation reflectance away from the object surface so that object absorption of thermal radiation is reduced accordingly.

DESCRIPTION OF A PREFERRED EMBODIMENT

Figure 1:
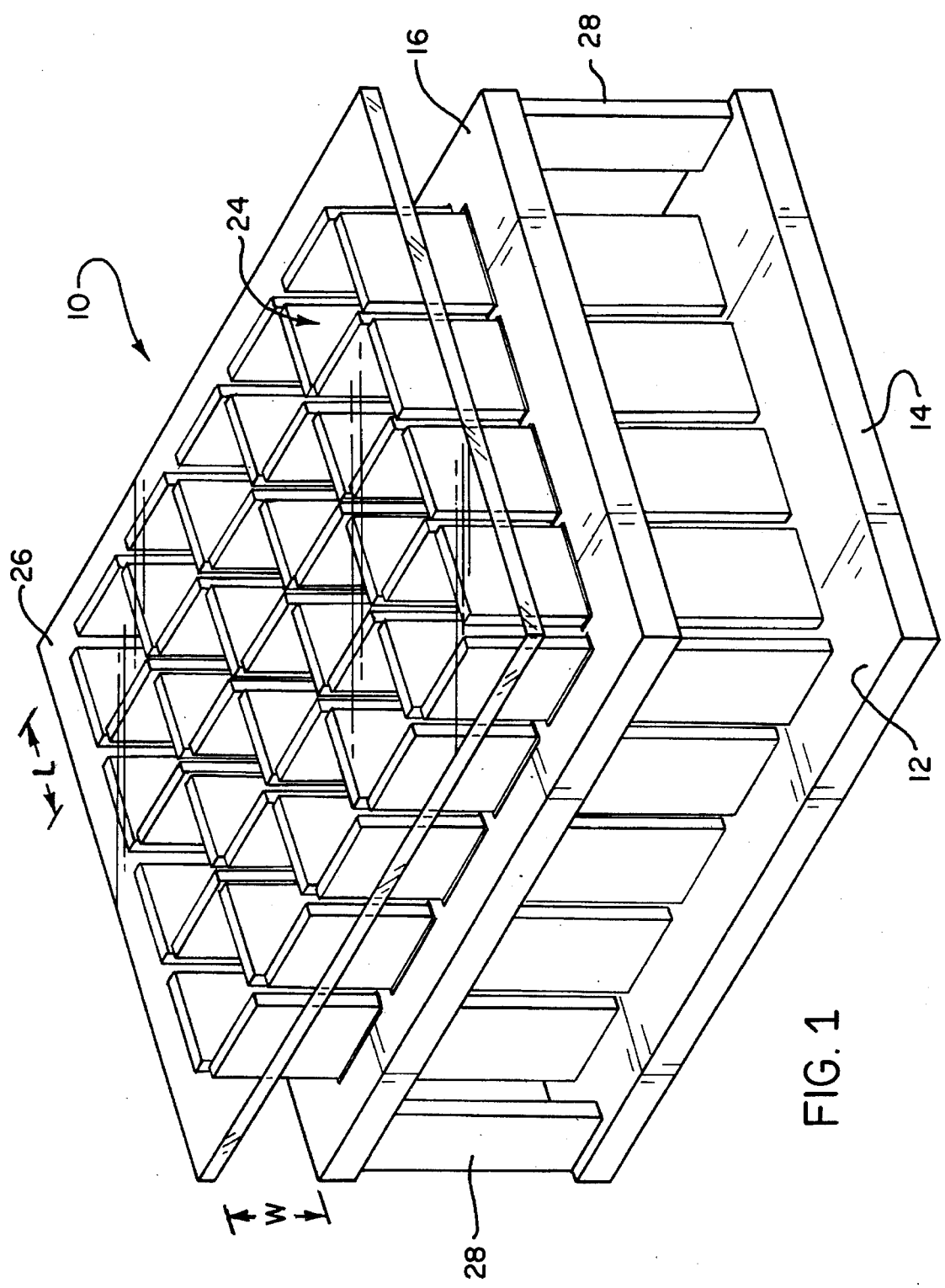
FIG. 1 is an isometric view of the apparatus of the present invention for effecting reflectance modification.
Figure 2:
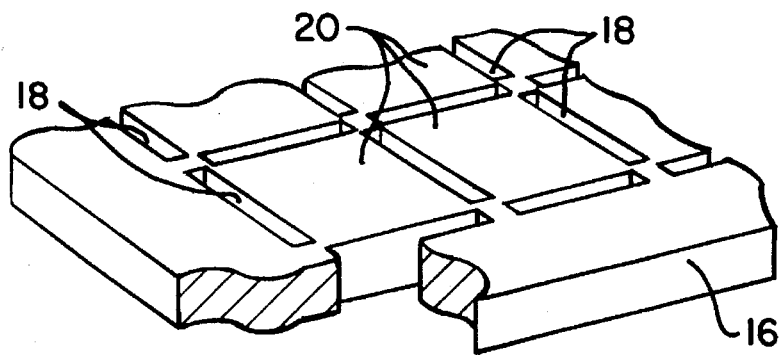
FIG. 2 is an enlarged, fragmentary view of a reflective modulator plate.
Figure 3:
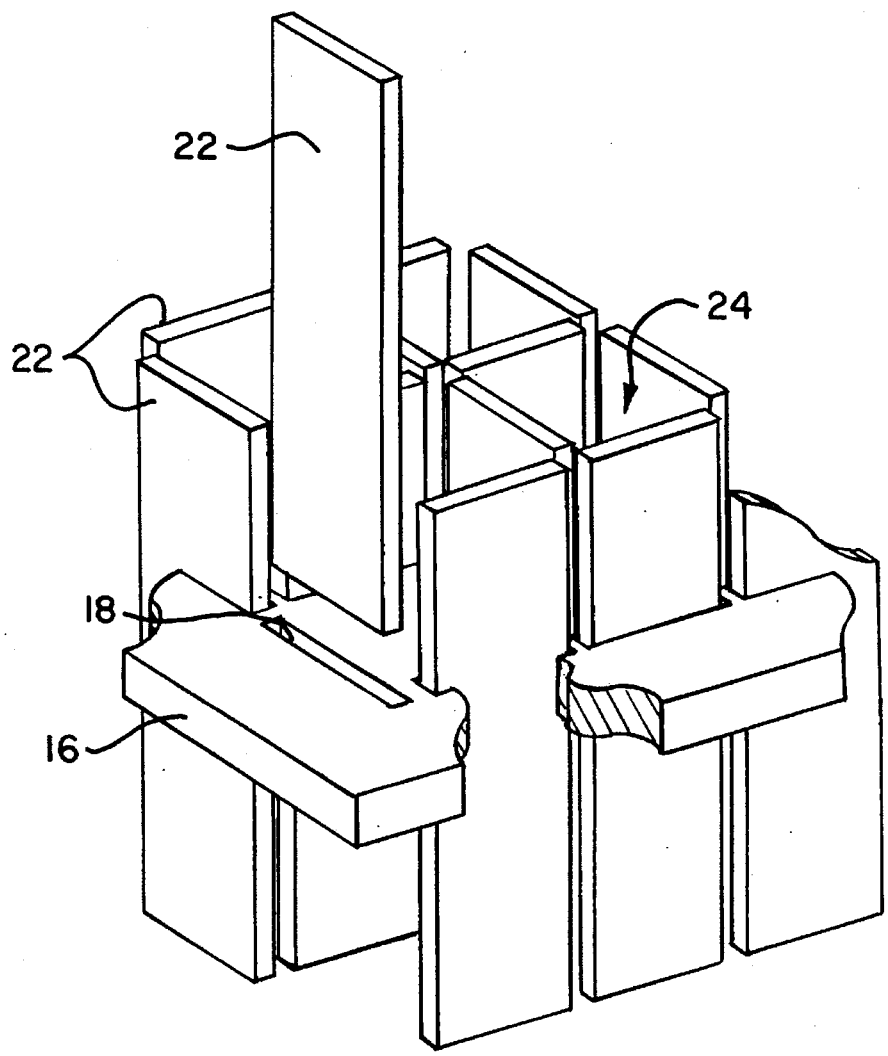
FIG. 3 is a perspective, partially exploded view of the invention.

With reference now to the drawing, the reflectance modulating apparatus of the present invention is enumerated generally as 10 and is seen to be secured onto the outer surface 12 of an object 14 to have the reflectance of incident radiation thereon modified in a desirable manner. Although this control of surface reflectance of the object, and thus the control of the amount of radiation that would be retained by the object, can apply to a number of different practical circumstances, it will be described herein as being applied to the surface of a space craft, for example. Also, although the range of radiation to be modulated can vary considerably depending primarily upon dimensional aspects of the apparatus, the apparatus will be described herein as applying specifically to reflectance control of radiation in the thermal band (i.e., 3–18 microns) and, therefore, for the end result of producing efficient thermal system management for a space craft.

A reflective modulator plate 16 particularly effective for reflecting infrared radiation, which is desired to be controlled, is a generally rectangular element provided with a plurality of identical straight-line slots 18 extending through the plate and which form a slot matrix enclosing a plurality of square, identically dimensioned wall portions 20.

An equal plurality of rectangular side wall plates 22 of identical geometry have such dimensions as to enable sliding receipt through a slot 18 forming overall a plurality of square cross-section cavities 24 opening outwardly away from the modulator plate 16. An adjustable amount of cavity volume is obtained on each side of the modulator plate depending upon the location of the modulator plate as it is moved along the side wall plates 22; however, it is those cavities extending outwardly away from the plate 16 and away from the object 14 that we are particularly concerned with here.

A cover 26 may be optionally securely located over the outermost ends of the side wall plates 22 enclosing the cavities 24. This cover must be highly transparent to the range of radiation sought to be controlled. A suitable material from which this cover can be made to use in controlling infrared radiation would be zinc selenide.

Post actuators 28 support at least a pair of opposite corners of the modulator plate 16 with respect to the object surface 12 and are affixed to both so that the entire assembly of the apparatus 10 is unitarily mounted onto the object 14. In a way to be described, the actuators operate to move the modulator plate toward and away from the object surface 12 and, in that way, produce a controlled amount of cavity depth extending outwardly beyond the modulator plate toward incoming radiation (arrow, FIG. 1). This action mechanically changes the depth of the black body cavities 24 and, thus, produces controllable reflectance of incoming radiation. Although other devices may be found satisfactory for this purpose, best results are believed obtained by constructing the post actuators 28 from a piezoelectric material which upon being appropriately electrically stimulated extends the posts (or retracts) them producing the desired mechanical movement of the modulator plate to maximize reflectance or reduce it, as desired.

Figure 4:
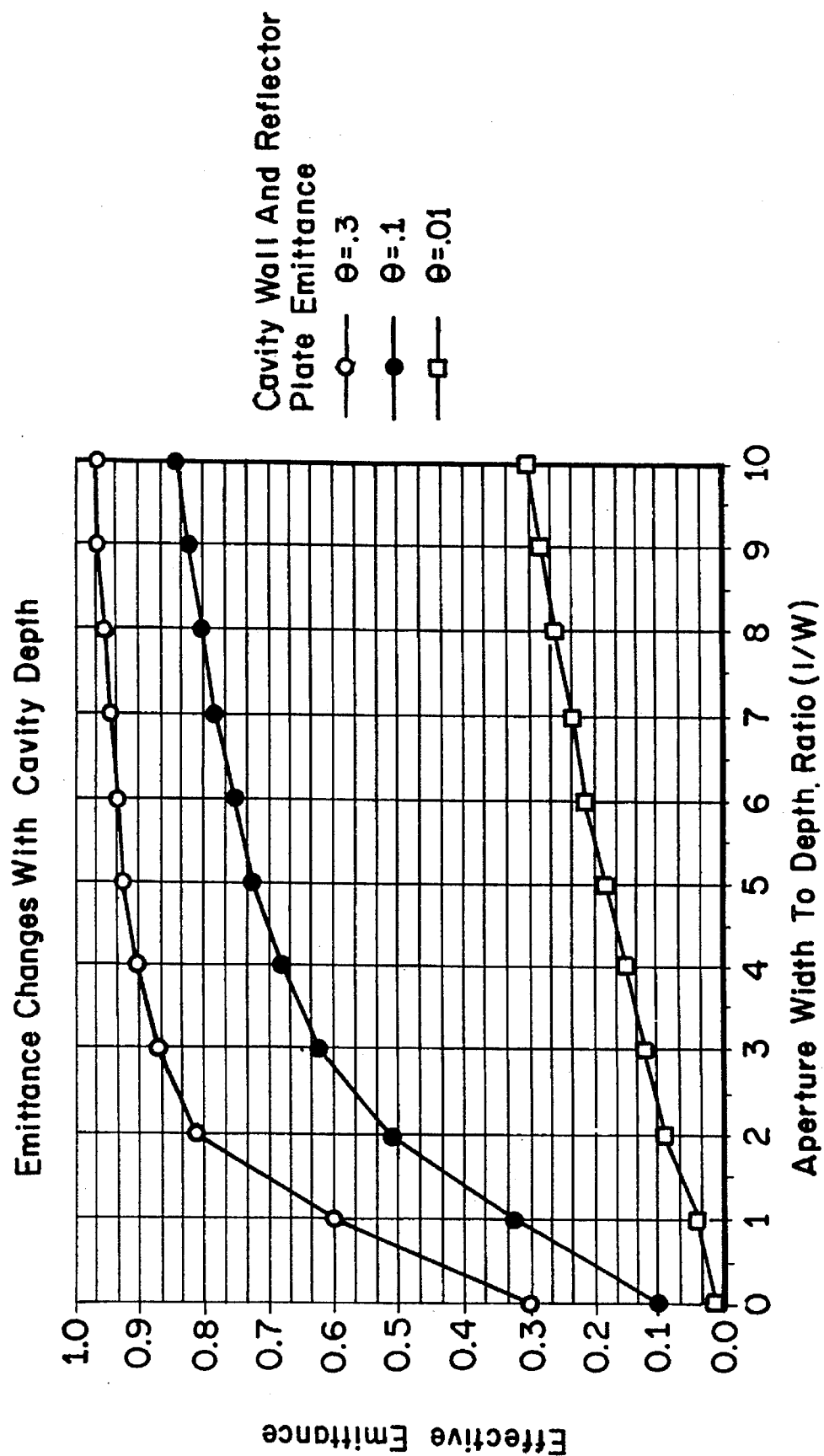
FIG. 4 is a graph of emittances obtained over a range of L/W ratios and for selective initial surface reflectances.

It can be shown for the cavity construction described that the effective emittance $\epsilon_o$, or reflectance which equals $1-\epsilon_o$, is generally represented by the following equation:

$$\epsilon_o = \left[ \frac{1}{1 + \frac{(1/\epsilon - 1)}{(1 + 4\alpha)}} \right] \left[ 1 + (1 - \epsilon) \left\{ \frac{1}{(1 + 4\alpha)} - \left( \frac{1}{\alpha^2 \pi} \right) \right\} \right]$$

where, $\epsilon$=emittance of modulator plate 16 and side wall plates 22
$\alpha = L/W$;
L=cavity edge
W=cavity depth FIG. 4 depicts effective emittances that are obtained for different values of $\alpha = L/W$ with selected surface emittances of the plate 16 and side wall plates 22.

Although other materials may be found suitable for making plate 16 and side wall plates 22, preferably they are constructed of silicon and formed to proper shape by micromachining techniques. To improve emitrance (or reflectivity) the outer surface of the modulator plate is coated with a metallic layer (e.g., gold). Moreover, with a fixed predetermined square dimension L, W will have to be adjustable in the range 6–10 L for a wide dynamic range of operation.

The side wall plates 22 are coated with a good radiation absorber (e.g., black). It has been found that where the reflectance of the modulator plate is >0.9 (i.e., $\epsilon < 0.1$) that excellent results are achieved when the side wall plates have a reflectivity <0.1.

In use, assuming that the object (e.g., space craft) is not being subjected to dangerously high infrared energy, it may be desirable that the object receive incident radiation without benefit of maximum reflection. This condition will occur when the reflective modulator plate is located closer to the object outer surface 12 which condition is achieved by appropriate energization of the post actuators 28. On a circumstance being presented where there is a high incidence of infrared radiation, the modulator plate 16 is actuated by appropriately energizing the piezoelectric post actuators to move toward the IR transparent cover 26 which increases the reflectance through the action of the black body cavities to an optimal point resulting in a substantially reduced amount of infrared energy actually reaching the object itself.

The described embodiment related to the controlled reflectance of thermal radiation. However, the black body cavities 24 on being appropriately dimensioned can be readily applied to controlling other ranges of radiation.

Also, although the invention has been described in connection with a preferred embodiment, it is to be understood that those skilled in the appertaining arts may contemplate changes within the spirit of the invention and within the scope of the appended claims.

What is claimed is:

1. Apparatus for controlling reflectance of incident electromagnetic energy from a surface, comprising:

a plurality of side wall plates arranged in spaced apart relation to define tubular cavities, each cavity having an open end to receive incident electromagnetic energy and pass it in a direction generally toward said surface;

movable modulator plate means forming a closed bottom wall for the cavities; and means for selectively moving the modulator plate means to vary the distance of said modulator plate means from the open ends of the cavities.

2. Apparatus as in claim 1, in which the modulator plate means includes a plurality of slots, each slot dimensioned to receive a single side wall plate therewithin; the selective moving means sliding the modulator plate means relative to the side wall plates located within the slot.

3. Apparatus as in claim 2, in which the side wall plates have identical length dimension axes and are slidingly received within the slots of the modulator plate means with said axes being parallel to each other.

4. Apparatus as in claim 1, in which the selective moving means includes a piezoelectric means having one surface physically connected to the modulator plate means and another surface fixedly positioned with respect to said modulator plate means.

5. Apparatus as in claim 1, in which the side wall plates are arranged parallel to one another forming cavities of square cross-section.

6. Apparatus as in claim 1, in which the bottom wall for the cavities has a reflectance <0.9 and the reflectance of facing surfaces of the side wall plates is <0.1.

7. Apparatus as in claim 1, in which the tubular cavities have a square cross-section, the side of each cavity having a length L; and said moving means being able to selectively move the modular plate means a distance up to 10 L.

8. Apparatus as in claim 1, in which a cover plate generally transparent to the incident electromagnetic energy is arranged in covering relation to the open ends of the cavities.

9. Apparatus as in claim 8, in which the cover plate is constructed of zinc selenide.

10. Apparatus for selectively controlling the amount of radiation absorbed by the surface of an object, comprising:

a plurality of means mounted in spaced apart relation on said object surface, said means being electrically energized to have an outer end surface thereof experience a modified dimensional extension with respect to the object surface;

a modulator plate affixed to outer end surfaces of the means for being moved with respect to the object surface, said modulator plate including a plurality of spaced apart slotlike openings enclosing a number of imperforate wall portions;

an identical plurality of side walls slidingly received within respective slotlike openings of the modulator plate and each side wall having an edge surface contacting the object surface, said side walls coacting to form cavities facing outwardly away from the modulator plate toward incoming radiation, said modulator plate wall portions respectively forming cavity bottoms; and an electrical power source for energizing said plurality of means.

11. Apparatus as in claim 10, in which the slotlike openings are such as to enclose square wall portions having a side equal to L.

12. Apparatus as in claim 11, in which the modified dimensional extension of said plurality of means has a maximum in the range of 6–10 L.

13. Apparatus as in claim 10, in which an outer surface of each of the cavity bottoms is a relatively good radiation reflector and facing surfaces of the side walls are relatively good radiation absorbers.

14. Apparatus as in claim 13, in which the reflectance of the outer surface of the cavity bottoms is >0.9 and the reflectance of the facing surfaces of the side walls is <0.1.

15. Apparatus as in claim 13, in which the outer surface of the cavity bottoms is deposited with a metal layer.

16. Apparatus as in claim 15, in which the metal layer is gold.

17. Apparatus as in claim 10, in which each means includes a piezoelectric column.

18. Apparatus as in claim 10, in which there is further provided a transparent cover plate located over the cavities.

19. Apparatus for reducing the amount of incident radiation absorbed by an object, comprising:

a plurality of cavity means unitarily mounted onto an outer surface of the object;

each cavity means having an open end facing toward incident radiation and an imperforate bottom wall located to receive radiation entering the cavity open end and reflecting a proportion thereof back out of the open end; and side wall surfaces of each cavity constructed of a relatively better absorber of radiation than the bottom wall.

20. Apparatus as in claim 19, in which the cavity bottom walls are covered with a metal layer.

21. Apparatus as in claim 20, in which the cavity means is constructed of silicon, and the metal layer is gold.

* * * * *